United States Patent
Weigel et al.

(12)

(10) Patent No.: US 6,699,542 B2
(45) Date of Patent: Mar. 2, 2004

(54) TUBULAR FILMS FORMED FROM CELLULOSE/PROTEIN BLENDS

(75) Inventors: Peter Weigel, Kleinmachnow (DE); Hans-Peter Fink, Teltow (DE); Michael Doss, Berlin (DE); Stefan Dominic Beckers, Hechtel-Eskel (BE); Roger Henri Hendrikx, Zonhofen (BE)

(73) Assignee: Fraunhofer-Gesellschaft zur Förderung der Angewandten forschung e.V. (DE)

( * ) Notice: Subject to any disclaimer, the term of this patent is extended or adjusted under 35 U.S.C. 154(b) by 0 days.

(21) Appl. No.: 10/168,707

(22) PCT Filed: Dec. 14, 2000

(86) PCT No.: PCT/EP00/12737

§ 371 (c)(1),
(2), (4) Date: Sep. 18, 2002

(87) PCT Pub. No.: WO01/45917

PCT Pub. Date: Jun. 28, 2001

(65) Prior Publication Data

US 2003/0062648 A1 Apr. 3, 2003

(30) Foreign Application Priority Data

Dec. 21, 1999 (DE) .......................................... 199 61 843

(51) Int. Cl.[7] .......................... B29C 47/12; B29C 47/88
(52) U.S. Cl. ...................................... 428/34.8; 426/514
(58) Field of Search ........................... 428/34.8; 426/514

(56) References Cited

U.S. PATENT DOCUMENTS 5,795,522 A    8/1998    Firgo et al. ................. 264/187

FOREIGN PATENT DOCUMENTS

| DE | 1 492 634 | 8/1972 | |
| DE | 36 90 798 C2 | 11/1990 | |
| DE | 44 21 482 A1 | 12/1995 | |
| DE | 297 17 310 U1 | 1/1998 | |
| EP | 0 910 961 A1 | 10/1998 | ............. A23P/1/08 |
| GB | 1086604 | 10/1967 | |
| JP | 269088 | 10/1989 | |
| JP | 09208714 A | 12/1997 | |
| WO | WO 95/07811 | 3/1995 | |
| WO | WO 95/35340 | 12/1995 | |
| WO | WO 01/45917 A1 | 6/2001 | |

OTHER PUBLICATIONS

International Search Report for PCT/EP 00/12737 dated Mar. 22, 2001.

*Primary Examiner*—Sandra M. Nolan
(74) *Attorney, Agent, or Firm*—Young & Basile, P.C.

(57) ABSTRACT

The invention relates to a method of manufacturing tubular films from a solution of a mixture if cellulose and proteins by extrusion blowing the solution over an air gap into a precipitation bath, and to the films produced with this method and their application.

11 Claims, No Drawings

TUBULAR FILMS FORMED FROM CELLULOSE/PROTEIN BLENDS

Just as in the manufacture of regenerated cellulose fibres, in the manufacture of cellulose films there have been increased efforts in recent years to replace the previously predominantly used expensive and environmentally harmful viscose process with more economic and more environmentally friendly methods. A particularly promising method here has proved to be spinning a solution of cellulose into an amine oxide, preferably N-methylmorpholine-N-oxide (NMMO), which is also used industrially already.

Up to now two methods have been suggested for manufacturing tubular films from the cellulose solution in NMMO. In the one method (EP 0 662 283, WO 95/07811) the solution emerging from the ring nozzle is drawn over a mandrel or over a device comprising a plurality of circular disks, which is located in the region of the air gap between the ring nozzle and the precipitation bath. In the second method (DE 44 21 482), the tubular film emerging from the ring nozzle is stabilised and expanded by the pressure of the column of liquid present in its interior and the column of air lying above same, by which means simultaneously biaxial stretching is achieved. Thus this method is similar to the known film blowing method which is used in particular in the manufacture of films from thermoplastic materials.

The tubular films thus produced can, however, frequently not be used directly for the planned purpose. In many cases expensive after-treatment of the films with plasticisers and lubricants or bonding agents is necessary.

Thus the object of the invention is to overcome the above-mentioned disadvantages of the cellulose films and to make available sufficiently strong and simultaneously flexible tubular films which make expensive after-treatment or surface treatment superfluous.

According to the invention, the object is achieved in that instead of pure cellulose a mixture of cellulose with one or more proteins is dissolved in the NMMO water system, and from this solution tubular films are produced according to one of the above-mentioned methods (EP 0 662 283, WO 95/07811 or DE 44 21 482) by extrusion from a ring nozzle over an air gap into a precipitation bath. It is preferred here if the proportion of protein is 1 to 80 wt-% in relation to the cellulose contained in the spinning solution. 5 to 50 wt-% is preferred.

Surprisingly it becomes apparent that the properties of the cellulose film can be influenced in the desired sense if proteins such as e.g. gelatine, collagen, casein or wheat gluten are added to the cellulose, and that a homogenous solution comprising cellulose, protein, NMMO and water can be processed in the same manner as a cellulose-NMMO solution in the blowing method.

Proteins or albuminous substances are as biopolymers a significant constituent of all living material and represent a particularly species-rich class of substances. They are copolymers of various amino acids. A large number of proteins of both animal and vegetable origin are produced partially in considerable amounts and are used for many applications, particularly also in the food industry.

The solubility of the proteins extends from good solubility in water (e.g. gelatine), over solubility in acid media (e.g. collagen) or in ethanol (e.g. zein) up to complete insolubility (e.g. with wool). However proteins do not form any genuine solutions but are only soluble in colloidal form. However it has become surprisingly apparent that nevertheless through the addition of colloidally dissolved proteins to cellulose dissolved in NMMO, a homogenous spinnable solution can be produced. Practically all available proteins which are colloidally soluble and also mixtures of such proteins can be used. Here the properties of the films can be influenced within wide limits by the protein content of the film and by the selection of the proteins used.

The manufacture of a homogenous spinning solution which contains beside cellulose also one or more proteins, proves to be very difficult since, when aqueous protein solutions are introduced, such as those of gelatine, casein and soybean protein, or ethanol solutions such as those of zein and wheat gluten, into the solution of cellulose in NMMO-monohydrate, normally used in spinning cellulose according to the NMMO method, the cellulose is precipitated. It is therefore a further object of the invention to quote a method by means of which a homogenous solution, such as is a pre-requisite for the blowing method, can be produced with the composition mentioned.

According to prior art, a spinnable solution of cellulose is produced in NMMO-monohydrate by the cellulose first swelling in an approximately 50% aqueous NMMO solution, and water being removed from this system at temperatures of approximately 90° C. until the NMMO is present as a monohydrate. Surprisingly it is now apparent that a proteinaceous spinnable solution is obtained if the aqueous protein solution is added to this batch, in which the cellulose is present swollen, and from the whole system the water is gradually removed until the cellulose is completely dissolved.

According to the invention, therefore, an aqueous colloidal solution of a protein is added to the system, comprising cellulose swollen in an aqueous NMMO solution, and water is removed from this system until the cellulose is completely dissolved.

This type of procedure is however only possible for water-soluble proteins. Surprisingly however it has become apparent that with the direct addition of water-insoluble proteins to the cellulose swollen in the NMMO solution, after the removal of the excess water not only the cellulose but also the proteins are dissolved and thus a spinnable solution is produced.

The proportion of proteins in the film in relation to the proportion of solid material can vary within wide limits and be between 1 and 80%. Particularly advantageous are proportions between 5 and 50%.

The tubular films produced from the described solution by means of a blowing method are, although strong, not creased but soft, flexible and resilient. The proteins here act as the plasticiser. The films therefore, when used as food packaging, especially as sausage skins, do not require any further after-treatment nor any surface treatment. The films are moisture-permeable like pure cellulose films. As a result of their elasticity, the film clings well to the filling, if the latter shrinks as a result of loss of moisture. The packaging skin is thus not wrinkled and unappetising. On the other hand, the films can be easily peeled away from the filling.

The invention will be explained in greater detail by the following examples listed.

EXAMPLE 1

Comparative Example According to Prior Art

A solution of 9.5% cellulose in NMMO-monohydrate having 0.1% by weight, in relation to the cellulose, propylgallate as the stabilising agent, was extruded downwards with a laboratory extruder through a film blowing nozzle with a diameter of 22 mm at a temperature of 95° C. over an external air gap of 10 mm in width, with a lag in the longitudinal direction of 1:4 and a transverse stretching ratio of 1:1.5, into a precipitation bath consisting of a 5% aqueous NMMO solution. The film produced has the following parameters:

|  | dry | wet |
|---|---|---|
| Film thickness [μm] | 16 | 35 |
| Strength, longitudinally [Mpa] | 162 | 27 |
| Strength, transversely [Mpa] | 97 | 10 |
| Elongation at break, longitudinally [Mpa] | 8 | 30 |
| Elongation at break, transversely [Mpa] | 18 | 35 |
| Elasticity modulus, longitudinally [Mpa] | 10200 | 215 |
| Elasticity modulus, transversely [Mpa] | 3740 | 25 |

EXAMPLE 2

Gelatine (Riedel-deHaën) is pre-swollen for 15 minutes in a 10-fold excess of water and then dissolved at 70° C. during stirring. This solution is added to the cellulose-NMMO-water mash and transformed by removal of water into a cellulose-gelatine solution. The cellulose-gelatine concentration was 9.5% with a cellulose to gelatine ratio of 85:15. The solution was extruded downwards with a laboratory extruder through a film blowing nozzle with a diameter of 22 mm at a temperature of 90° C., over an external air gap of 10 mm in width with a lag in the longitudinal direction of 1:4 and a transverse stretching ratio of 1:1.5, into a precipitation bath consisting of a 5% aqueous NMMO solution. The film produced has the following parameters.

|  | dry | wet |
|---|---|---|
| Film thickness [μm] | 18 | 35 |
| Strength, longitudinally [Mpa] | 198 | 27 |
| Strength, transversely [Mpa] | 114 | 17 |
| Elongation at break, longitudinally [Mpa] | 8 | 30 |
| Elongation at break, transversely [Mpa] | 30 | 86 |
| Elasticity modulus, longitudinally [Mpa] | 12400 | 215 |
| Elasticity modulus, transversely [Mpa] | 4600 | 126 |

EXAMPLE 3

Wheat gluten (Pfeifer & Langen, Dormagen) is suspended in a 20-fold amount of water at 60° C. with stirring for 15 minutes. This suspension is added to the cellulose-NMMO mash and is transformed by the removal of water into a cellulose-wheat gluten solution. The cellulose-wheat gluten concentration was 9.5% with a cellulose to wheat gluten ratio of 85:15. The solution was extruded downwards with a laboratory extruder through a film blowing nozzle with a diameter of 22 mm at a temperature of 90° C., over an external air gap of 10 mm in width with a lag in the longitudinal direction of 1:4 and a transverse stretching ratio of 1:1.5, into a precipitation bath consisting of a 5% aqueous NMMO solution. The film produced has the following parameters.

|  | dry | wet |
|---|---|---|
| Film thickness [μm] | 17 | 38 |
| Strength, longitudinally [Mpa] | 210 | 27 |
| Strength, transversely [Mpa] | 108 | 20 |
| Elongation at break, longitudinally [Mpa] | 10 | 22 |
| Elongation at break, transversely [Mpa] | 22 | 93 |
| Elasticity modulus, longitudinally [Mpa] | 12000 | 265 |
| Elasticity modulus, transversely [Mpa] | 3190 | 82 |

What is claimed is:

1. Method for manufacturing oriented tubular films through extrusion of a spinning solution by means of a ring nozzle over an external air gap into a precipitation bath, characterised in that the spinning solution consists of a homogeneous solution of a mixture of cellulose and protein in a NMMO-water system, wherein the homogeneous solution is produced by withdrawing the water of the solution until both the cellulose and the proteins are dissolved completely.

2. Method according to claim 1, characterised in that the spinning solution contains 1 to 80 wt-% protein in relation to the added cellulose content.

3. Method according to claim 1 characterised in that the proteins are soluble in water, acid or alkaline medium.

4. Method according to claim 3, characterised in that the proteins are selected from the group consisting of gelatin, collages, casein, soya protein, zein or wheat gluten or mixtures of same.

5. Method according to claim 1, characterised in that a homogenous and spinnable solution of cellulose, protein, NMMO and water is used.

6. Method according to claim 1, characterised in that the homogeneous spinning solution is produced by the proteins being introduced together with the cellulose first of all into a roughly 40% (w/w) aqueous NMMO solution.

7. Oriented tubular film, which has been manufactured by extrusion from a ring nozzle over an external air gap in a precipitation bath, characterised in that the tubular film consists of cellulose and protein.

8. Oriented tubular film according to claim 7, characterised in that the proportion of the proteins in the film in relation to the proportion of solid matter in the film is 1 to 80 wt-%.

9. Oriented tubular film according to claim 8, characterised in that the proportion of protein is 5 to 50%.

10. Use of the tubular film according to claim 7 characterised in that it is used as a biodegradable and compostable packaging material.

11. Use according to claim 10, characterised in that the films are used as sausage skins for hard sausages and also as peelable skin.

* * * * *